March 14, 1961

R. DAMIANI 2,974,911

PLATFORM SUPPORTING THE SEATS IN AN AIRCRAFT
COMBINED WITH MEANS FOR EJECTING THE SEATS
FROM THE AIRCRAFT IN CASE OF DISASTER

Filed Nov. 3, 1958

INVENTOR.
RICHARDO DAMIANI
BY MICHAEL S. STRIKER.
ATTORNEY

March 14, 1961

R. DAMIANI 2,974,911

PLATFORM SUPPORTING THE SEATS IN AN AIRCRAFT
COMBINED WITH MEANS FOR EJECTING THE SEATS
FROM THE AIRCRAFT IN CASE OF DISASTER

Filed Nov. 3, 1958

INVENTOR.
RICHARDO DAMIANI
BY
MICHAEL S. STRIKER.
ATTORNEY.

March 14, 1961 R. DAMIANI 2,974,911
PLATFORM SUPPORTING THE SEATS IN AN AIRCRAFT
COMBINED WITH MEANS FOR EJECTING THE SEATS
FROM THE AIRCRAFT IN CASE OF DISASTER
Filed Nov. 3, 1958 4 Sheets-Sheet 3

INVENTOR.
RICHARDO DAMIANI
BY
MICHAEL S. STRIKER
ATTORNEY.

March 14, 1961
R. DAMIANI
2,974,911
PLATFORM SUPPORTING THE SEATS IN AN AIRCRAFT
COMBINED WITH MEANS FOR EJECTING THE SEATS
FROM THE AIRCRAFT IN CASE OF DISASTER
Filed Nov. 3, 1958
4 Sheets-Sheet 4
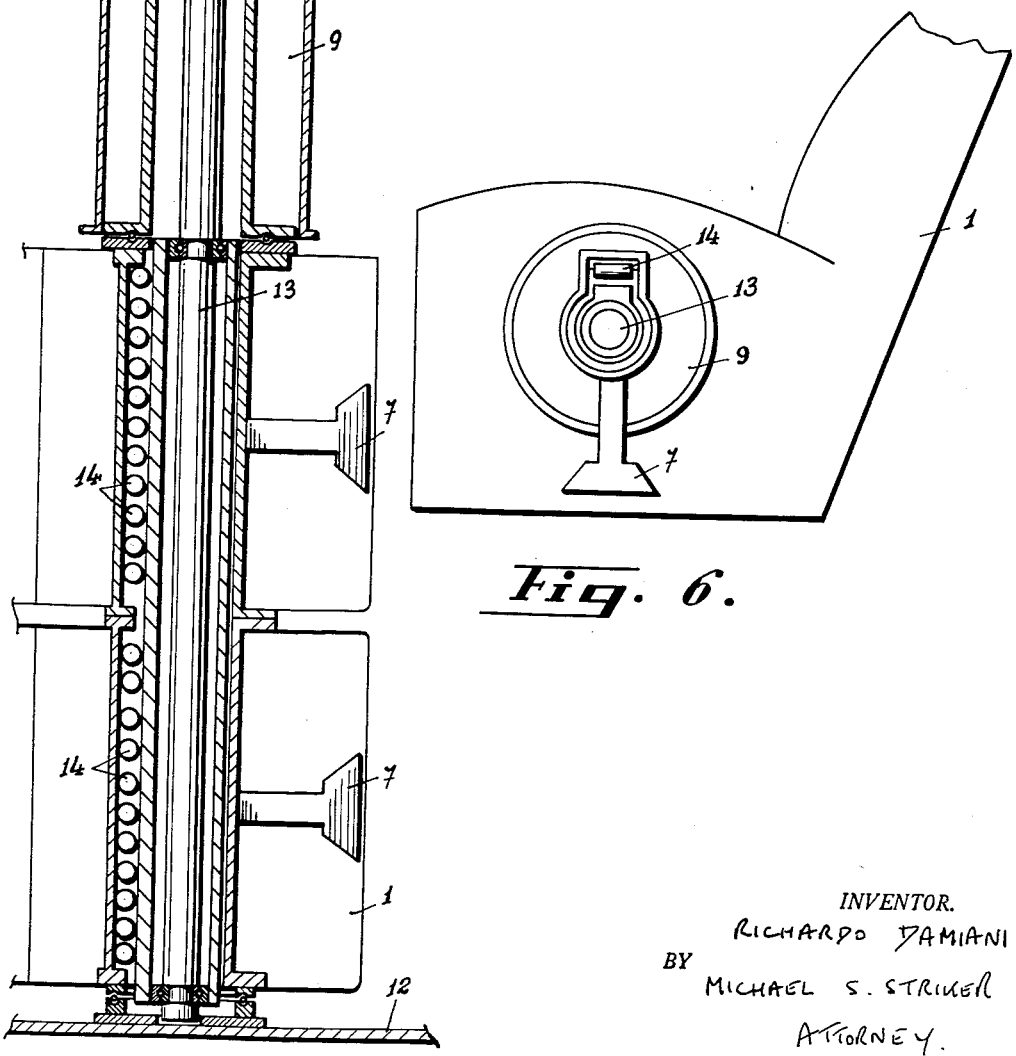
INVENTOR.
RICHARDO DAMIANI
BY MICHAEL S. STRIKER
ATTORNEY.

United States Patent Office 2,974,911
Patented Mar. 14, 1961

2,974,911

PLATFORM SUPPORTING THE SEATS IN AN AIRCRAFT COMBINED WITH MEANS FOR EJECTING THE SEATS FROM THE AIRCRAFT IN CASE OF DISASTER

Ricardo Damiani, Argentine Ave. 340, Rosario, Santa Fe, Argentina

Filed Nov. 3, 1958, Ser. No. 771,273

6 Claims. (Cl. 244—122)

This invention relates to a platform for supporting the seats in aircraft provided with lateral openings permitting in case of disaster the sideways ejection of said seats, and also to means capable of effecting such ejection either automatically or by control.

It is a known fact that when an aircraft meets with disaster the majority of victims is generally to be found amongst the passengers who normally are helpless inside an airplane in case of accident as the parachutes are kept in special compartments known only to the crew and perhaps to some experienced passenger, and there is not always sufficient time to distribute the parachutes, to brief the passengers regarding their use, to open the door and to make the individual passengers jump successively in the proper way required by this operation which is impossible to perform under the grip of panic and which is always made difficult by the natural fear of empty space and height.

Consequently any really effective rescue equipment must allow for lack of co-operation by the passengers at the time of danger, relying for the correct carrying out of the operation on the responsibility of the crew who, being more experienced, can proceed rapidly and unerringly without losing precious seconds which may mean the saving of many lives.

The invention has taken into account all these factors; thus, according to the invention the seats to be occupied by the passengers are arranged on individual platforms, adjacent lateral openings in the fuselage, in registry with the windows, which seats can be ejected from the aircraft in case of danger through said lateral openings, and once the seats with the passengers on them are outside the parachute with which each seat is provided will open.

These platforms are of the longitudinally swinging type so that irrespective of the position of the airplane the seats with the passengers will keep their normal position, and the ejection opening is of a size that permits the seats to be ejected without difficulty irrespective of the position of said platforms with said seats.

For the purposes of the ejection it is preferred to use compressed air the effect of which is sure and quick and the respective equipment can be combined with the sealing means of the openings in order to synchronize the operation.

The control of the assembly of devices of the rescue unit may be automatic, e.g. in relation to the position of the aircraft, or controlled in which latter case its operation will be determined by the crew according to their experience.

In order to swing, the platforms are provided with counterweights tending to keep them in their usual normal position, which counterweights may be substituted, if considered convenient, by a suitable construction and distribution of the weight of said platforms.

The operation of the ejection equipment proper may likewise be mechanical (by means of springs), hydraulic or similar, without departing from the scope of the invention.

The invention may of course be put into practice using the sizes, materials and shapes considered most suitable.

In order that this invention may be clearly understood and readily carried out it will now be described in detail by way of example with reference to the accompanying drawings in which:

Fig. 5 is a longitudinal section of an embodiment of the platform in which the seats include independent counterweights.

Fig. 6 is a detail in cross section of the embodiment of Fig. 5.

In all of the aforementioned figures, like reference characters indicate like or corresponding parts.

Figure 1:
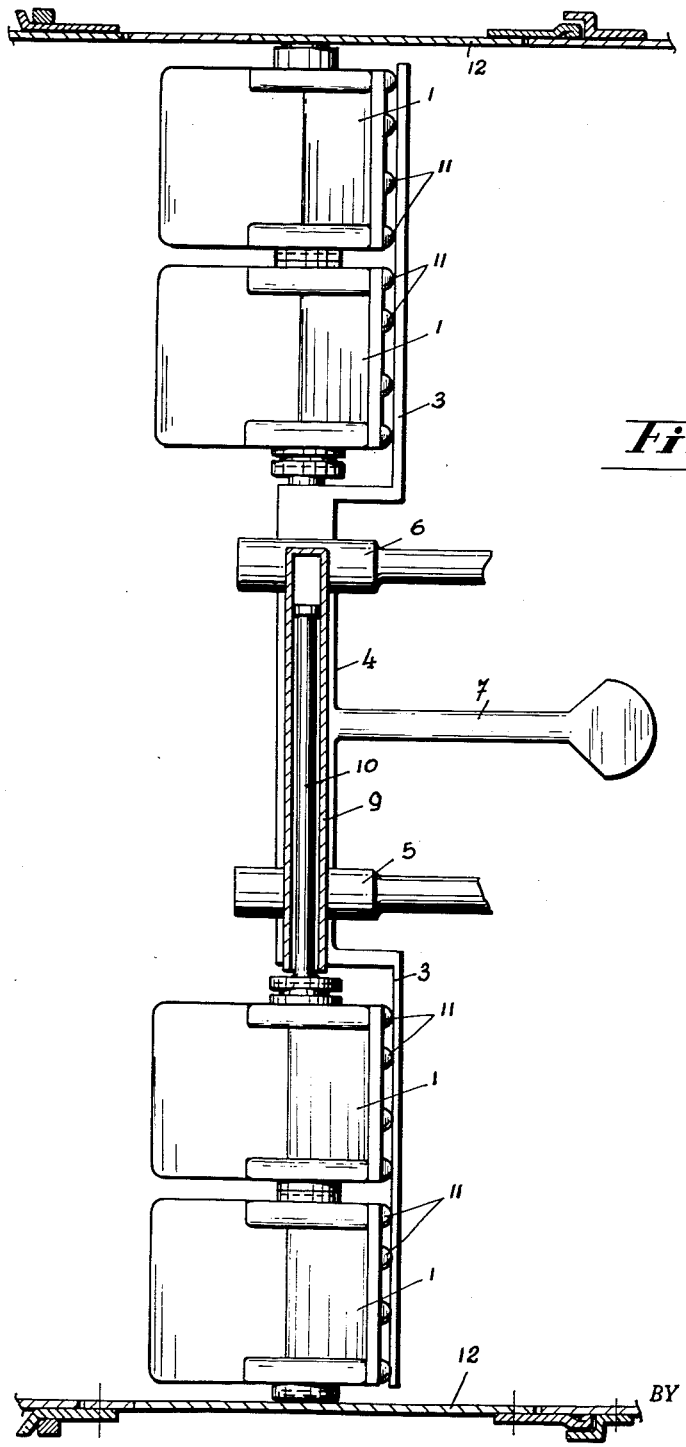
Fig. 1 is a front elevation partially in section, showing the arrangement of a pair of platforms aligned inside the aircraft.
Figure 2:
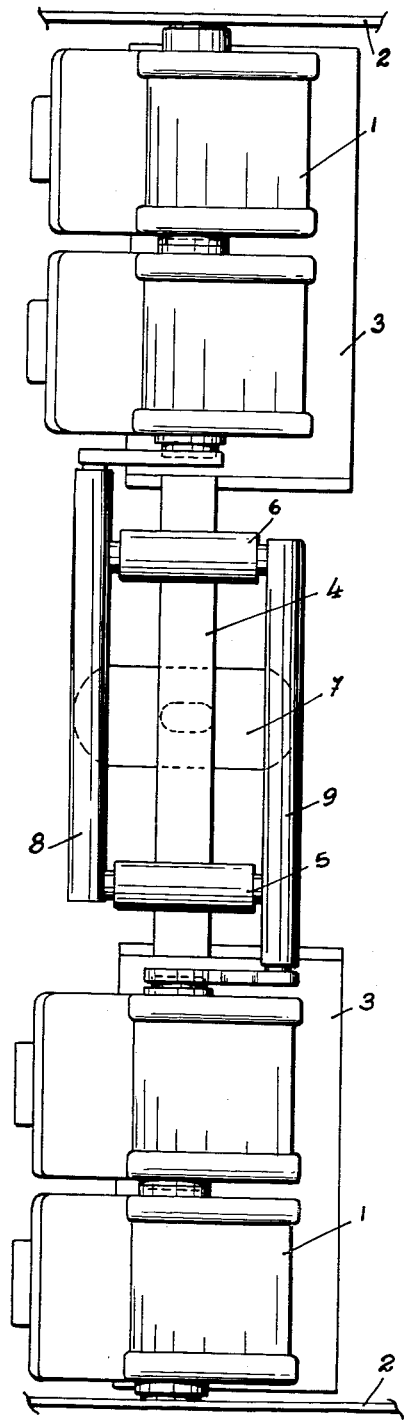
Fig. 2 is a plan view of the arrangement of Fig. 1.
Figure 3:
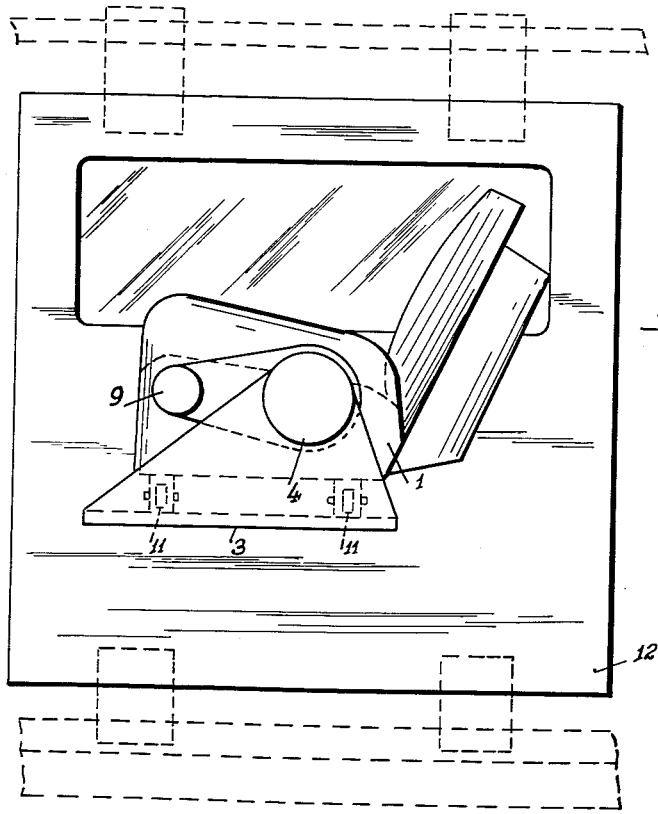
Fig. 3 is a side elevation showing the arrangement of one of the platforms with its seats and the panel covering the ejection opening.
Figure 4:
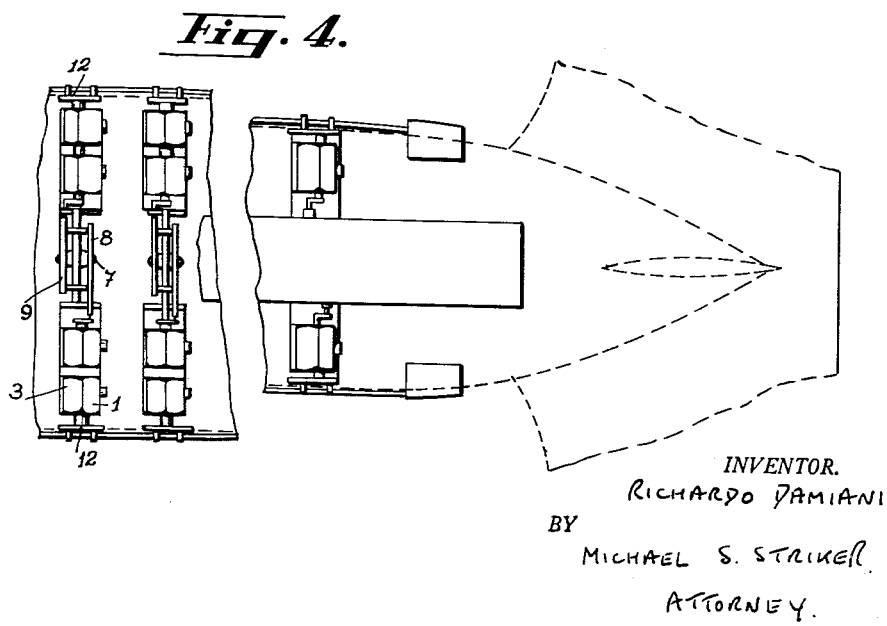
Fig. 4 is a plan view of the inside of an aircraft in which the seats for the passengers and the crew are mounted on platforms according to the invention.

Referring now to annexed illustrative drawings, in the aircraft in which the arrangement of this invention is incorporated, the seats 1 are situated at both sides of the cabin adjacent the side walls 2 of the latter on platforms 3 which are wider than the seats in order to allow the passenger to place his feet comfortably on the platform. These platforms are interconnected by means of a shaft 4 resting on bearings 5, 6 positioned centrally in the cabin; said platform has in its centre a counterweight 7 tending to keep the seats with the platform in their normal horizontal position irrespective of the longitudinal inclination of the aircraft. Parallel to the shaft and on opposite sides of the same are arranged the pressure cylinders 8, 9 in which the stems 10 are housed, connected to the seats; said stems may be ejected by the pressure of the fluid in the corresponding cylinder, causing the seats to be displaced sideways on wheels 11 and along the platforms towards the sides of the cabin whose openings are closed by displaceable or withdrawable panels 12, in synchronism with the movement of the seats towards said sides.

The mechanism referred to may also be embodied according to the variant of Fig. 5 in which the seats are supported by shafts 13 through the intermediary of bearing rollers 14 constituting antifriction devices. The seats will move on rollers 14 when the force is applied to eject the seats.

The compressed air may be supplied by a master cylinder, compressor tank, etc. and the synchronized control mechanism for starting the operation of the opening device of the ejection outlets of the seats and of the ejection mechanism may function automatically, eventually electrically, or by control, according as may be judged most convenient for the purposes specified.

The arrangement of the invention functions as follows: when the disaster happens and the airplane, losing its stability, reaches the critical inclination exceeding the safety angle, the opening mechanism of the ejection outlets for the seats is operated, either automatically or by action of the crew, thus clearing the side openings; meanwhile the passengers have remained in their normal position due to the platforms being able to swing, thus avoiding confusion and sudden falls; when the outlets are fully open the ejecting mechanism starts to operate, pushing the seats sideways and throwing them into the empty space where the parachutes incorporated in the seats open; these parachutes are preferably of the automatic operation type. The means for removing piston rod means 10 axially out of cylinder means 8, 9 respectively, form no part of this invention. The piston and piston rod means and control devices thereof may be of a construction shown in U.S. Patents 1,347,157, issued to E. C. Hanson and 2,358,603, issued to Southerland. The parachutes shown in these patents can also be used in connection with the seat means of the present application. The same applies to the release of the door openings of the aircraft cabin.

What I claim is:

1. In an aircraft having door openings at the side thereof arranged for emergency ejection, the combination of aircraft cabin means; cylinder means mounted in said aircraft cabin means for pivotal movement over 360°, said cylinder means extending in a horizontal plane when the aircraft is on the ground; piston rod means removably mounted in said cylinder means for axial movement therein but constrained against pivotal movement relative thereto so as to pivot with said cylinder means; seat means secured to said piston rod means arranged for a normal position; and counterweight means secured to said cylinder means permanently pivoting said cylinder means into a position wherein said seat means occupy said normal position, whereby on application of a force onto said piston rod means in an axial direction, the same will be ejected from said cylinder means to be forced through a door opening of the aircraft, to eject said seat means from said cabin means.

2. In an aircraft having door openings at the side thereof arranged for emergency ejection, the combination of aircraft cabin means; cylinder means mounted in said aircraft cabin means for pivotal movement over 360°, said cylinder means extending in a horizontal plane when the aircraft is on the ground; piston rod means removably mounted in said cylinder means for axial movement therein but constrained against pivotal movement relative thereto so as to pivot with said cylinder means; seat means secured to said piston rod means arranged for a normal position; and counterweight means secured to said cylinder means intermediate of its ends permanently pivoting said cylinder means into a position wherein said seat means occupy said normal position, whereby on application of a force onto said piston rod means in an axial direction, the same will be ejected from said cylinder means to be forced through a door opening of the aircraft, to eject said seat means from said cabin means.

3. In an aircraft having door openings at the side thereof arranged for emergency ejection, the combination of aircraft cabin means; cylinder means mounted in said aircraft cabin means transverse to the movement of the aircraft for pivotal movement over 360°, said cylinder means extending in a horizontal plane when the aircraft is on the ground; piston rod means removably mounted in said cylinder means for axial movement therein but constrained against pivotal movement relative thereto so as to pivot with said cylinder means; seat means secured to said piston rod means arranged for a normal position; and counterweight means secured to said cylinder means intermediate of its ends permanently pivoting said cylinder means into a position wherein said seat means occupy said normal position, whereby on application of a force onto said piston rod means in an axial direction, the same will be ejected from said cylinder means to be forced through a door opening of the aircraft, to eject said seat means from said cabin means.

4. In an aircraft having door openings at the side thereof arranged for emergency ejection, the combination of a pair of cylinder means mounted in said aircraft cabin means in side by side relationship transverse to the movement of the aircraft or joint pivotal movement over 360°, said cylinder means extending in a horizontal plane when the aircraft is on the ground; a connecting member secured to said pair of cylinder means; piston rod means removably mounted in each of said cylinder means for axial movement therein but constrained against pivotal movement relative thereto so as to pivot with said cylinder means; seat means secured to said piston rod means arranged for a normal position; and counterweight means secured to said connecting member intermediate of its ends permanently pivoting said cylinder means into a position wherein said seat means occupy said normal position, whereby on application of a force onto said piston rod means in an axial direction, the same will be ejected from said cylinder means to be forced through a door opening of the aircraft, to eject said seat means from said cabin means.

5. In an aircraft having door openings at the side thereof arranged for emergency ejection, the combination of aircraft cabin means; fluid pressure cylinder means mounted in said aircraft cabin means for pivotal movement over 360°, said cylinder means extending in a horizontal plane when the aircraft is on the ground; piston rod means removably mounted in said cylinder means for axial movement therein but constrained against pivotal movement relative thereto so as to pivot with said cylinder means; seat means secured to said piston rod means arranged for a normal position; and counterweight means secured to said cylinder means intermediate of its ends permanently pivoting said cylinder means into a position wherein said seat means occupy said normal position, whereby on application of fluid pressure onto said piston rod means in an axial direction, the same will be ejected from said cylinder means to be forced through a door opening of the aircraft, to eject said seat means from said cabin means.

6. In an aircraft having door openings at the side thereof arranged for emergency ejection, the combination of aircraft cabin means; a pair of pneumatic cylinder means mounted in said aircraft cabin means in side by side relationship transverse to the movement of the aircraft for joint pivotal movement over 360°, said cylinder means extending in a horizontal plane when the aircraft is on the ground; a connecting member secured to said pair of cylinder means; piston rod means removably mounted in each of said cylinder means for axial movement therein but constrained against pivotal movement relative thereto so as to pivot with said cylinder means; seat means secured to said piston rod means arranged for a normal position; and counterweight means secured to said connecting member intermediate of its ends permanently pivoting said cylinder means into a position wherein said seat means occupy said normal position, whereby on application of air pressure onto said piston rod means in an axial direction, the same will be ejected from said cylinder means to be forced through a door opening of the aircraft, to eject said seat means from said cabin means.

References Cited in the file of this patent

UNITED STATES PATENTS

| | | |
|---|---|---|
| 1,347,157 | Hanson | July 20, 1920 |
| 1,831,166 | Fells | Nov. 10, 1931 |
| 1,859,542 | Trusty | May 24, 1932 |
| 2,120,477 | Adams | June 14, 1938 |
| 2,358,603 | Southerland | Sept. 19, 1944 |
| 2,390,230 | Trusty | Dec. 4, 1945 |
| 2,497,153 | Cosakis | Feb. 14, 1950 |
| 2,707,086 | Kennard | Apr. 26, 1955 |